United States Patent
Nishi et al.

(10) Patent No.: US 6,467,358 B1
(45) Date of Patent: Oct. 22, 2002

(54) METHOD OF MEASURING FLOW RATES OF RESPECTIVE FLUIDS CONSTITUTING MULTIPHASE FLUID AND FLOW METER FOR MULTIPHASE FLOW UTILIZING SAME

(75) Inventors: Tomomi Nishi, Tokyo (JP); Shuichi Haruyama, Tokyo (JP); Yoshiaki Tanaka, Tokyo (JP); Manabu Fueki, Tokyo (JP); Daisuke Yamazaki, Tokyo (JP)

(73) Assignees: Japan National Oil Corp., Tokyo (JP); Yokogawa Electric Corporation, Tokyo (JP); NKK Corporation, Tokyo (JP); Japan Petroleum Exploration Co., Ltd., Tokyo (JP); Teikoku Oil Co., Tokyo (JP)

( * ) Notice: Subject to any disclaimer, the term of this patent is extended or adjusted under 35 U.S.C. 154(b) by 0 days.

(21) Appl. No.: 09/175,385

(22) Filed: Oct. 19, 1998

(30) Foreign Application Priority Data

| Oct. 22, 1997 | (JP) | ............................................. 9-289379 |
| Oct. 22, 1997 | (JP) | ............................................. 9-289380 |
| Oct. 22, 1997 | (JP) | ............................................. 9-289381 |

(51) Int. Cl.$^7$ ............................ G01F 1/74; G01F 1/712
(52) U.S. Cl. ................................ 73/861.04; 73/861.06
(58) Field of Search .................... 73/861.04, 861.06, 73/861.01

(56) References Cited

U.S. PATENT DOCUMENTS

| 3,066,529 A | 12/1962 | Warren | ......................... 73/194 |
| 3,635,082 A | 1/1972 | Prellwitz et al. | .......... 73/194 M |
| 4,604,902 A | 8/1986 | Sabin et al. | .............. 73/861.04 |
| 4,604,904 A * | 8/1986 | Massen | .................... 73/861.06 |
| 4,884,457 A | 12/1989 | Hatton | ..................... 73/861.04 |
| 4,899,101 A | 2/1990 | Porges | .......................... 324/663 |
| 4,975,645 A * | 12/1990 | Lucas | ....................... 73/861.04 |
| 5,022,274 A | 6/1991 | Klinzing et al. | ......... 73/861.04 |
| 5,095,758 A * | 3/1992 | Cox et al. | ................. 73/861.04 |
| 5,351,521 A * | 10/1994 | Cracknell | .................... 73/19.1 |
| 5,396,806 A | 3/1995 | Dechene et al. | ......... 73/861.04 |
| 5,719,340 A * | 2/1998 | Poortmann et al. | ...... 73/861.08 |

FOREIGN PATENT DOCUMENTS

| EP | 0510774 A2 | 10/1992 | ............. G01F/1/74 |
| GB | 2106645 A | 4/1983 | ............. G01F/1/74 |
| GB | 2219396 A | 12/1989 | ............. G01P/5/22 |
| WO | WO 93/24811 | 12/1993 | ............. G01F/1/74 |

* cited by examiner

*Primary Examiner*—Harshad Patel
(74) *Attorney, Agent, or Firm*—Porter Wright Morris & Arthur LLP

(57) ABSTRACT

A flow meter for a multiphase flow which comprises a cross-correlation flow meter (26) for measuring basic values to calculate component ratios of respective fluids constituting a multiphase fluid (2) comprising a gas and a plurality of liquids in a pipe (1) through which the multiphase fluid flows; and an arithmetic circuit (22) for calculating flow rates of the respective fluids, which acquires information concerning ratios of liquid phase components of the multiphase fluid (2) on the basis of both measured values obtained by the cross-correlation flow meter (26) at an instance when the pipe (1) is filled with liquid alone during the passage of the multiphase fluid (2) through the pipe (1) provided with the cross-correlation flow meter (26) and characteristic values of the respective fluids of the multiphase fluid (2), acquires information concerning ratios of the respective fluids from a time average of the measurements obtained by the cross-correlation flow meter (26) and the respective characteristic values, then obtains the component ratios of the respective fluids by utilizing the fact that a sum of the component ratios of the respective fluids becomes (1), calculates an average flow velocity of the multiphase fluid (2) from time between fluctuations of the measured values obtained by the cross-correlation flow meter (26), and calculates flow rates of the respective fluids by utilizing the respective component ratios and the average flow velocity.

19 Claims, 3 Drawing Sheets

PRIOR ART

METHOD OF MEASURING FLOW RATES OF RESPECTIVE FLUIDS CONSTITUTING MULTIPHASE FLUID AND FLOW METER FOR MULTIPHASE FLOW UTILIZING SAME

BACKGROUND

The present invention relates to an apparatus for on-line measurement of flow rates of respective fluids of a multiphase fluid comprising oil, water, gas, etc. and flowing in a pipe, without separating the respective fluids.

Conventionally, a flow meter for a multiphase flow composed of three or more sensors such as a water cut meter utilizing a difference in electrical properties among fluids, a density meter utilizing differences in density among fluids, and a flow meter measuring a total flow rate or a flow velocity of a multiphase fluid has been employed for measuring flow rates of respective fluids constituting a multiphase fluid.

FIG. 7 is a block diagram of such a conventional flow meter for a multiphase flow. This flow meter for a multiphase flow is constituted by a total of three sensors, that is, a cross-correlation flow meter 6 composed of two capacitance water cut meters 3 and 3' and a gamma-ray densitometer 7 for measuring an average density of a multiphase fluid 2.

These capacitance water cut meters 3 and 3' are composed of electrodes 4 and 4' and impedance measurement circuits 5 and 5' provided in a pipe 1, and the gamma-ray densitometer 7 is composed of a source of gamma rays 8 and a detector 9.

An absolute pressure meter 10 and a thermometer 11 are used for temperature correction of parameters such as density and dielectric constant of respective fluids and a (volume) flow rate of gas.

Now, a principle of measurement for the conventional apparatus is described.

An electrostatic capacity C of a multiphase fluid 2, which consists of oil, water, and gas and flows in a pipe 1, is measured with a capacitance water cut meter 3 and a transmittance $\lambda$ for gamma rays of the multiphase fluid 2 is measured with a gamma-ray densitometer 7. Equation (1)

$$H_P + H_W + H_G = 1 \tag{1}$$

wherein $H_P$ represents an oil phase ratio, $H_W$ represents a water phase ratio, and $H_G$ represents a gas phase ratio for the multiphase fluid 2, is established.

When known relative dielectric constants of oil, water, and gas are expressed by $\epsilon_P$, $\epsilon_W$, and $\epsilon_G$, Equation (2):

$$\epsilon_P H_P + \epsilon_W H_W + \epsilon_G H_G = f_\epsilon(C) \tag{2}$$

is established for the relationship between the known relative dielectric constants and the electrostatic capacity C measured.

When known densities of oil, water, and gas are expressed by $\rho_P$, $\rho_W$, and $\rho_G$, Equation 3:

$$\rho_P H_P + \rho_W H_W + \rho_G H_G = f_\rho(\lambda) \tag{3}$$

is established for the relationship between the known densities and the gamma-ray transmittance $\lambda$ measured.

Then, $f_\epsilon(C)$ and $f_\rho(\lambda)$ are intrinsic functions of the capacitance water cut meter 3 and the gamma-ray densitometer 7, and provide an average dielectric constant of the multiphase fluid 2 from an electrostatic capacity C and an average density of the multiphase fluid 2 from the transmittance $\lambda$, respectively.

On the other hand, a cross-correlation flow meter 6 composed of two capacitance water cut meters 3 and 3' measures a travel speed of fluctuations of electrostatic capacity C, that is, an average flow velocity u of the multiphase fluid 2.

An arithmetic circuit 12 to calculate flow rates of the respective phases calculates an oil phase ratio $H_P$, a water phase ratio $H_W$, and a gas phase ratio $H_G$ for the multiphase fluid 2 from the simultaneous equations (1)–(3) and then calculates flow rates of the respective fluids $Q_P$, $Q_W$, and $Q_G$ from Equations (4-1), (4-2), and (4-3) using a cross section A of the pipe 1 and the average flow velocity u.

$$Q_P = H_P \cdot A \cdot u \tag{4-1}$$

$$Q_W = H_W \cdot A \cdot u \tag{4-2}$$

$$Q_G = H_G \cdot A \cdot u \tag{4-3}$$

A method of obtaining a flow velocity from fluctuations of a multiphase fluid is described in detail in Japanese Patent Application No. 8-128389, etc.

However, such a conventional apparatus requires a combination of at least three sensors such as two capacitance water cut meters and a gamma-ray densitometer to obtain component ratios and average flow velocities of respective fluids constituting a multiphase fluid and thus interferes with simplification and size-reduction of a structure of a flow meter for a multiphase flow.

In addition, since an average flow velocity u is solely used to calculate flow rates, there has been such a problem that errors in flow rates of respective fluids measured become larger when a velocity slip (difference in velocity) exists between gas and liquid.

SUMMARY OF THE INVENTION

It is an object of the present invention to provide a flow meter for a multiphase flow composed of a smaller number of sensors than the conventional apparatuses and to provide a flow meter for a multiphase flow enabling highly accurate measurement in spite of velocity slip between gas and liquid.

According to the method of the present invention, a cross-correlation flow meter for measuring basic values to calculate component ratios of respective fluids constituting a multiphase fluid comprising a gas and a plurality of liquids is provided to obtain the component ratios of the respective fluids on the basis of the measured values of the cross-correlation flow meter; when there is no velocity slip between a gas phase and a liquid phase in the multiphase fluid, an average flow velocity of the multiphase fluid is obtained on the basis of time between fluctuations of the measured values of the cross-correlation flow meter and then flow rates of the respective fluids are obtained by utilizing the respective component ratios and the average flow velocity; and when there is a velocity slip between the gas and liquid phases, a flow velocity of the gas phase of the multiphase fluid is obtained on the basis of time between fluctuations of the measured values of the cross-correlation flow meter, and a sensor for measuring basic values to calculate a flow velocity of the liquid phase of the multiphase fluid is provided to obtain the flow velocity of the liquid phase on the basis of the measured values of the sensor, and then the flow rates of the respective fluids are calculated by utilizing the component ratio of a fluid in gas phase, the flow velocity of the gas phase, the component ratios of fluids in the liquid phase and the flow velocity of the liquid phase.

The cross-correlation flow meter comprises two component ratio meters for measuring predetermined electrical values in a pipe through which the multiphase fluid flows, and the component ratios of the respective fluids are obtained by acquiring information concerning component ratios of the fluids in the liquid phase components from both measured values obtained by the component ratio meters at an instance when the pipe is filled with liquid alone during the passage of the multiphase fluid through the pipe and electrical characteristic values of the respective fluids, acquiring information concerning the component ratios of the respective fluids from both a time average of the measured values obtained by the component ratio meters and the respective electrical characteristic values, and utilizing the fact that a sum of the component ratios of the respective fluids becomes 1.

In addition, the cross-correlation flow meter comprises two radiation densitometers for measuring radiation transmittance in a pipe through which the multiphase fluid flows, and the component ratios of the respective fluids are obtained by acquiring information concerning component ratios of the fluids in the liquid phase from both measured values obtained by the radiation densitometers at an instance when the pipe is filled with liquid alone during the passage of the multiphase fluid through the pipe and densities of the respective fluids, acquiring information concerning component ratios of the respective fluids from both a time average of the measured values obtained by the radiation densitometers and the respective densities, and utilizing the fact that a sum of the component ratios of the respective fluids becomes 1.

A differential pressure of the multiphase fluid is measured with a differential pressure type flow meter and a flow velocity of the liquid phase is obtained on the basis of the measured differential pressure, an average density of the multiphase fluid, and an intrinsic coefficient for the differential pressure type flow meter.

The apparatus of the present invention comprises a cross-correlation flow meter provided in a pipe through which a multiphase fluids comprising a gas and plurality of liquids, for measuring basic values to calculate component ratios of respective fluids constituting the multiphase fluid; and an arithmetic circuit for calculating flow rates of the respective fluids, by acquiring information concerning component ratios of fluids in a liquid phase of the multiphase fluid from both measured values obtained by the cross-correlation flow meter at an instance when the pipe is filled with liquid alone during the passage of the multiphase fluid through the pipe provided with the cross-correlation flow meter and characteristic values of the respective fluids of the multiphase fluid, acquiring information concerning the component ratios of the respective fluids from both a time average of the measured values obtained by the cross-correlation flow meter and the respective characteristic values, obtaining the component ratios of the respective fluids by utilizing the fact that a sum of the component ratios of the respective fluids becomes 1, calculating an average flow velocity of the multiphase fluid on the basis of time between fluctuations of the measured values obtained by the cross-correlation flow meter, and utilizing the respective component ratios and the average flow velocity for the calculation of the flow rates.

The apparatus of the present invention comprises a sensor provided in a pipe, for measuring basic values to calculate a flow velocity of a liquid phase of a multiphase fluid; and the arithmetic circuit for calculating flow rates of the respective fluids with an additional function to calculate a flow velocity of a gas phase of the multiphase fluid on the basis of time between fluctuations of the measured values of the cross-correlation flow meter when there is a velocity slip between a gas phase and a liquid phase of the multiphase fluids, to calculate a flow velocity of the liquid phase on the basis of the measured values obtained by the sensor, and to calculate flow rates of the respective fluids by utilizing the component ratio and the flow velocity of the gas phase and the respective component and the flow velocity of the liquid phase.

In addition, the cross-correlation flow meter comprises two component ratio meters for measuring an electrostatic capacity of the multiphase fluid and the characteristic values are in relative dielectric constant. in addition, the cross-correlation flow meter comprises two radiation densitometers for measuring radiation transmittance of a multiphase fluid and characteristic values are in density.

Each of the component ratio meters comprises a cylindrical driving electrode for applying a voltage signal of predetermined amplitude and frequency to the multiphase fluid and a cylindrical measurement electrode virtually grounded for detecting a current flowing in through the multiphase fluid, both electrodes being arranged in parallel with the pipe through which the multiphase fluid flows, so as to measure a water phase ratio in the multiphase fluid by measuring an electrostatic capacity between the cylindrical driving electrode and the cylindrical measurement electrode, wherein a cylindrical dummy electrode with a potential identical to that of the cylindrical measurement electrode is placed between the cylindrical driving electrode and the cylindrical measurement electrode so as to reduce a part of an electric line of force toward the cylindrical measurement electrode through the vicinity of the wall of the pipe.

When an inner diameter of the pipe and inner diameters of the respective cylindrical electrodes are expressed by D, the widths of the cylindrical driving electrode, the cylindrical measurement electrode, and the cylindrical dummy electrode are expressed by $l_s$, $l_m$, and $l_d$, respectively, a distance between the cylindrical driving electrode and the cylindrical measurement electrode is expressed by L, and a distance between the cylindrical driving electrode and the cylindrical dummy electrode is expressed by x, $l_s/D=0.3-1.0$
$l_m/D=0.3-1.0$
$l_d/D=0.1-0.5$
$L/D=1.0-2.0$
$x/D=0.4-1.2$.

The constitution of the present invention enables to constitute a flow meter for a multiphase flow with a smaller number of sensors than conventional ones and thus enables simplification and size-reduction of apparatuses. In addition, even when there is a velocity slip between gas and liquid, highly accurate measurement of flow rates of the respective phases can be achieved by only adding a sensor. Furthermore, the accuracy of measurement of flow rate is enhanced through improvement of a component fraction meter.

DETAILED DESCRIPTION OF THE PREFERRED EMBODIMENTS

Embodiment 1

Figure 1:
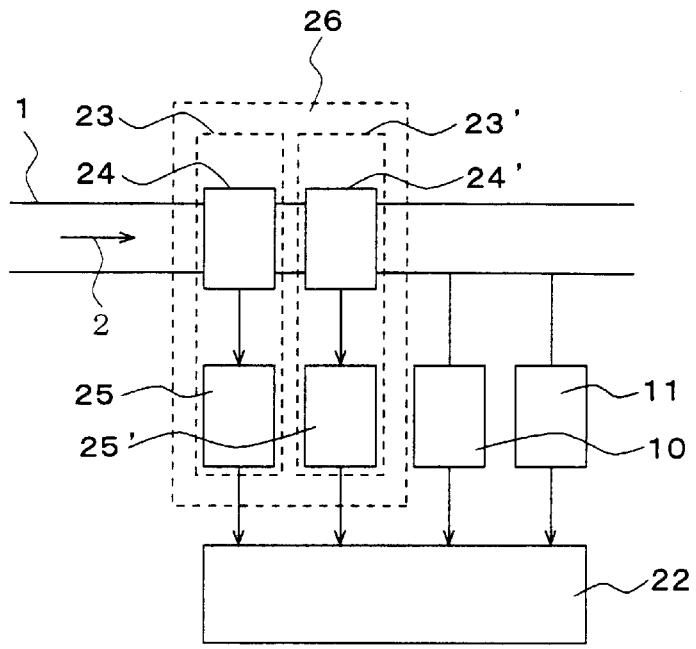
FIG. 1 is a block diagram of a flow meter for a multiphase flow according to Embodiment 1.

FIG. 1 is a block diagram of a flow meter for a multiphase flow according to the present invention. A cross-correlation flow meter 26 is composed of two capacitance water cut meters 23 and 23', which comprise electrodes 24 and 24' provided in a pipe 1 and impedance measurement circuits 25 and 25' receiving the outputs from the electrodes 24 and 24' to measure an electrostatic capacity C of a fluid flowing through the pipe 1. The impedance measurement circuits 25 and 25' may be those measuring impedance at one frequency, that is, those possessing a source of voltage signal of one frequency.

Figure 2:
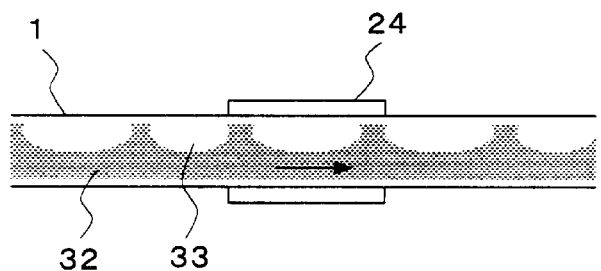
FIG. 2 is a flow pattern of a multiphase fluid in a pipe.
Figure 3:
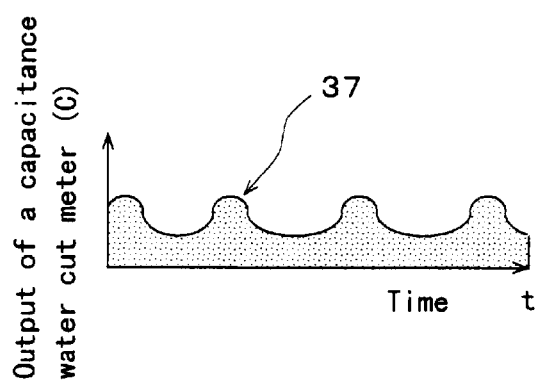
FIG. 3 shows a time-series waveform showing the output values of a capacitance water cut meter.

A multiphase fluid comprising a gas and a plurality of liquids flows, in most cases, in a flow pattern with large bubbles 33 such as a slug flow and a plug flow through the pipe 1, as shown in FIG. 2. In FIG. 2, 32 denotes a liquid phase consisting of oil and water. FIG. 3 shows a time-series waveform of electrostatic capacity C measured by the capacitance water cut meter 23 at the time when the multiphase fluid flows in this pattern. The time-series waveform of electrostatic capacity C exhibits a vibrational waveform. The electrostatic capacity C becomes smaller when a large bubble 33 is passing through the electrode 24 and it becomes the maximum 37 when the large bubble 33 has passed the electrode 24 and only a liquid phase 32 exists. A ratio between oil and water is not changed before, while, or after a large bubble 33 passes through.

When an oil phase ratio, a water phase ratio, and a gas phase ratio of a multiphase fluid 2 consisting of gas, water, and oil are expressed by $H_P$, $H_W$, and $H_G$, respectively, Equation (5) is established:

$$H_P + H_W + H_G = 1 \qquad (5)$$

When known relative dielectric constants of the oil, water, and gas are expressed by $\epsilon_P$, $\epsilon_W$, and $\epsilon_G$, Equation (6):

$$\epsilon_P H_P + \epsilon_W H_W + \epsilon_G H_G = f_\epsilon(C_{mean}) \qquad (6)$$

is established for the relationship between relative dielectric constant and a mean $C_{mean}$ of the electrostatic capacities C measured by the capacitance water cut meter 23.

For the maximum $C_{max}$ of electrostatic capacity C, on the other hand, since relative dielectric constants of oil and water only should be considered, Equation 7:

$$\epsilon_P H_P + \epsilon_W H_W = (1 - HG) \cdot f_\epsilon(C_{max}) \qquad (7)$$

is established.

Then, $f_\epsilon(C_{mean})$ and $f_\epsilon(C_{max})$ are intrinsic functions of the capacitance water cut meter 23, and provide an average dielectric constant of the multiphase fluid 2 from the electrostatic capacity $C_{mean}$ and the maximum dielectric constant of the multiphase fluid 2 from the electrostatic capacity $C_{max}$.

An average flow velocity u of the multiphase fluid 2 is measured from time between fluctuations of electrostatic capacity C which can be detected as a result of constituting the cross-correlation flow meter 26 with two capacitance water cut meters 23 and 23'.

An arithmetic circuit 22 to calculate flow rates of the respective phases calculates an oil phase ratio $H_P$, a water phase ratio $H_W$, and a gas phase ratio $H_G$ for a multiphase fluid 2 from the simultaneous equations (5)–(7) and then calculates flow rates of the respective fluids $Q_P$, $Q_W$, and $Q_G$ from Equations (4-1), (4-2), and (4-3) using a cross section A of the pipe 1 and the average flow velocity u.

The arithmetic circuit 22 to calculate flow rates of the respective phases can incorporate measurements from an absolute pressure meter 10 and a thermometer 11, as conventionally, to perform temperature correction of parameters such as density and dielectric constant of the respective fluids and (volume) flow rate of gas.

Embodiment 2

Figure 4:
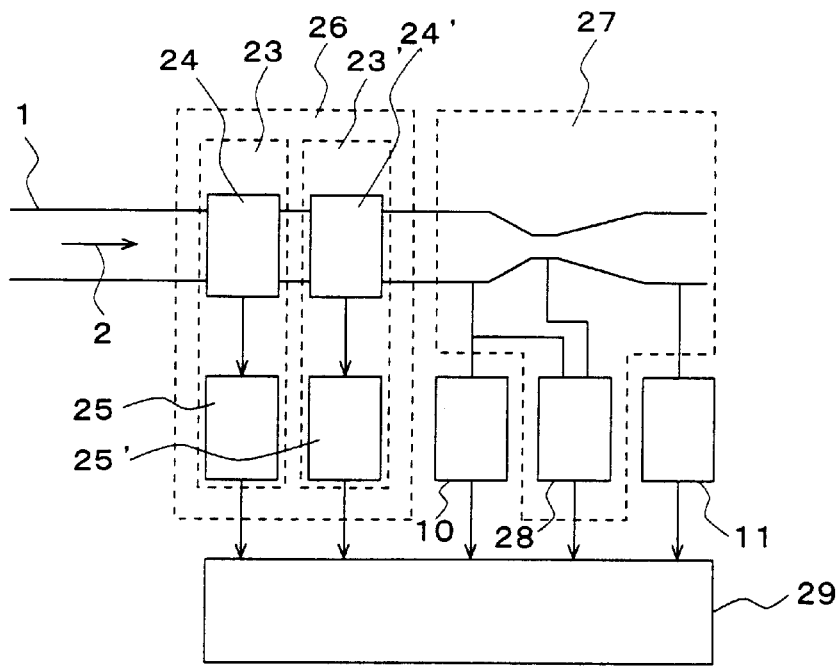
FIG. 4 is a block diagram of a flow meter for a multiphase flow according to Embodiment 2.

Now, a flow meter for a multiphase flow, which is effective when there is a velocity slip (difference in flow velocity) between gas and liquid of a multiphase fluid, is described. FIG. 4 shows a block diagram of the flow meter in which a differential pressure the flow meter 27 is added to the configuration of FIG. 1. Capacitance water cut meters 23 and 23' may have a voltage signal source at a frequency, as in Embodiment 1. The differential pressure type flow meter 27 is provided with a differential pressure gauge 28.

Since a multiphase fluid flows, in most cases, in a flow pattern with large bubbles called a slug flow or a plug flow, regardless of the presence of a velocity slip between gas and liquid, component fractions of the respective fluids contained can be calculated according to a principle similar to that in Embodiment 1. That is, when a multiphase fluid 2 consists of gas, water, and oil, an oil phase ratio $H_P$, a water phase ratio $H_W$, and a gas phase ratio $H_G$ can be measured using only a capacitance water cut meter 23. In addition, since fluctuations of electrostatic capacity C detected due to the fact that a cross-correlation flow meter is constituted by two capacitance water cut meters 23 and 23' are caused by travel of large bubbles, a travel speed of large bubbles, that is, a gas phase velocity $u_G$ of the multiphase fluid 2 can be measured from time between fluctuations.

On the other hand, when a velocity slip s between gas and liquid (=gas phase velocity $u_G$/liquid phase flow velocity $u_L$) is considered, a relationship between known densities of oil, water, and gas, $\rho_P$, $\rho_W$, and $\rho_G$, and an average density of the multiphase fluid 2, $\rho_M$, is expressed by Equation (8):

$$\rho_M = f_P(H_P, H_W, H_G, s) \cdot \rho_P + f_W(H_P, H_W, H_G, s) \cdot \rho_W + f_G(H_P, H_W, H_G, s) \cdot \rho_G \qquad (8)$$

wherein, $f_P$, $f_W$, and $f_G$ are weighted coefficients of density of the respective fluids and provided by a function of $H_P$, $H_W$, $H_G$, and s.

A relationship between a differential pressure $\Delta p_v$ detected with a differential pressure type flow meter 27 and a liquid phase flow velocity $u_L$ of a multiphase fluid 2 is expressed by Equation (9):

wherein $C_v$ is an intrinsic flow rate coefficient of a differential pressure type flow meter 27.

Then, an arithmetic circuit 29 to calculate flow rates of the respective phases calculates the respective component fractions, $H_P$, $H_W$, and $H_G$, using Equations (5)–(7) in Embodiment 1 and a liquid phase flow velocity $u_L$ by solving the simultaneous equations (8) and (9).

In addition, the arithmetic circuit 29 to calculate flow rates of the respective phases calculates flow rates of the respective fluids of the multiphase fluid 2, $Q_P$, $Q_W$, and $Q_G$, by Equations (10-1), (10-2), and (10-3) using the component ratios $H_P$, $H_W$, and $H_G$ calculated based on the measurements obtained by the capacitance water cut meter 23, the gas phase velocity $u_G$ calculated based on the measurements obtained by the cross-correlation flow meter 26, and the liquid phase velocity $u_L$ calculated based on the measurement by the differential pressure type flow meter 27.

$$Q_P = H_P \cdot A \cdot u_L \quad (10\text{-}1)$$

$$Q_W = H_W \cdot A \cdot u_L \quad (10\text{-}2)$$

$$Q_G = H_G \cdot A \cdot u_G \quad (10\text{-}3)$$

When a cross-correlation flow meter is constituted by two microwave water cut meters or two gamma-ray densitometers, instead of the capacitance water cut meters 23 and 23', component fractions of the respective fluids constituting a multiphase fluid may be obtained in a similar way of thinking.

Component ratios of the respective fluids constituting a multiphase fluid may be obtained, in a similar way of thinking, by using electrical characteristic values such as conductivity and magnetic permeability instead of relative dielectric constant.

As shown by the above respective embodiments, component ratios of a multiphase fluid, for example, a multiphase fluid consisting of oil-water-gas can be measured by using only conventional sensors for measuring component fractions of a two-phase fluid consisting of gas and water, such as a water cut. meter and a gamma-ray densitometer so that a structure of a component ratio meter can be downsized.

In addition, since it is sufficient to provide only one measurement condition, measurement can be simplified. For example, when an electrostatic capacity is used, it is sufficient to conduct measurement at one frequency, and when microwave and gamma rays are used, it is sufficient to perform measurement at one wavelength.

In addition, even when there is a velocity slip between gas and liquid, an addition of one sensor enables measurement of flow rates of respective phases with high accuracy.

Finally, a constitution of a capacitance water cut meter which further increases accuracy of the flow meter for a multiphase flow of the present invention is described.

Figure 5:
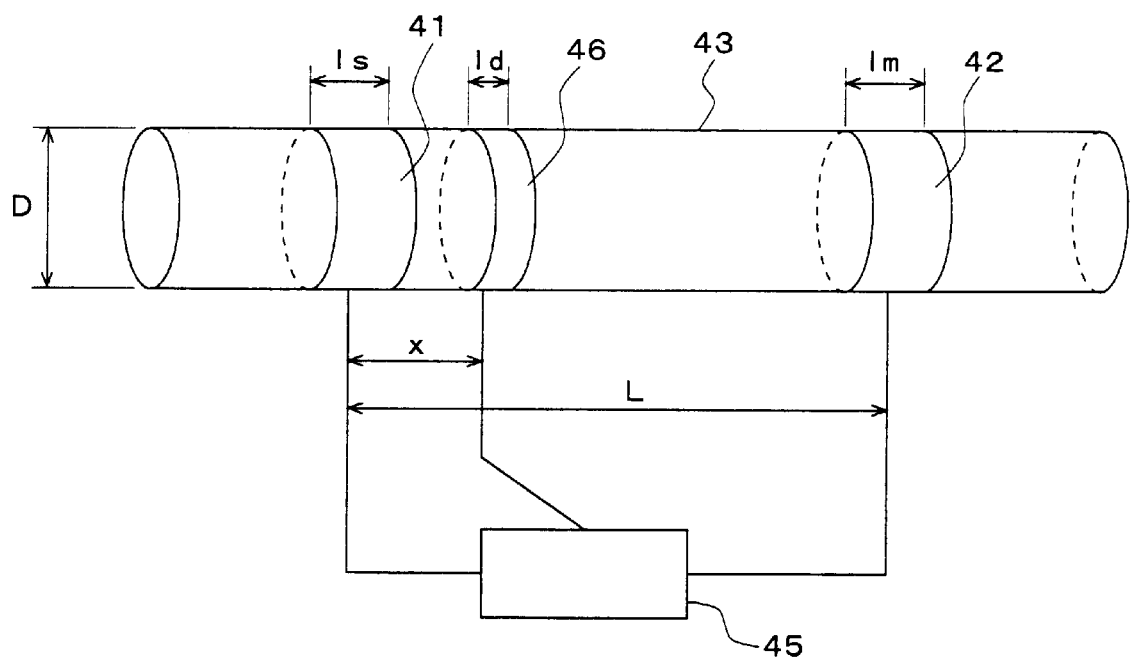
FIG. 5 is a block diagram of a capacitance water cut meter utilizing parallel cylindrical electrodes.

FIG. 5 is a block diagram of the capacitance water cut meter. In the capacitance water cut meter, a cylindrical dummy electrode 46 with a width of $l_d$ is additionally placed between a cylindrical driving electrode 41 and a cylindrical measurement electrode 42, both electrodes being arranged apart from each other in the pipe 43 through which a multiphase fluid flows, with the intention of measuring an electrostatic capacity of a multiphase flow by an electrostatic capacity measurement circuit or an impedance measurement circuit 45 based on all output values of these electrodes 41, 42, and 46, to obtain a water phase ratio based on the electrostatic capacity. In other words, between a cylindrical driving electrode 41 to apply a voltage signal at a certain amplitude and a certain frequency and a cylindrical measurement electrode 42 virtually grounded (in a condition where grounded potential is obtained actually even if it is not actually grounded) to detect a current flowing in through a multiphase fluid, a dummy electrode 46 with a potential identical to that of the cylindrical measurement electrode 42 is arranged-to measure an electrostatic capacity between the cylindrical driving electrode 41 and the cylindrical measurement electrode 42, while absorbing and reducing a part of an electric line of force toward the cylindrical measurement electrode 42 though the vicinity of the wall of the pipe 43.

When an inner diameter of a pipe 43 and inner diameters of the respective cylindrical electrodes are. expressed by D, widths of a cylindrical driving electrode 41, a cylindrical measurement electrode 42, and a cylindrical dummy electrode 46 are expressed by $l_s$, $l_m$, and $l_d$, respectively, and a distance between the cylindrical driving electrode 41 and the cylindrical measurement electrode 42 is expressed by L, and a distance between the cylindrical driving electrode 41 and the cylindrical dummy electrode 46 is expressed by x, by setting $l_s/D = 0.3 - 1.0$
$l_m/D = 0.3 - 1.0$
$l_d/D = 0.1 - 0.5$
$L/D = 1.0 - 2.0$
$x/D = 0.4 - 1.2$, a capacitance water cut meter is optimized. Especially preferably, $l_d/D = 0.1 - 0.2$ and $x/D = 0.4 - 0.8$.

Figure 6:
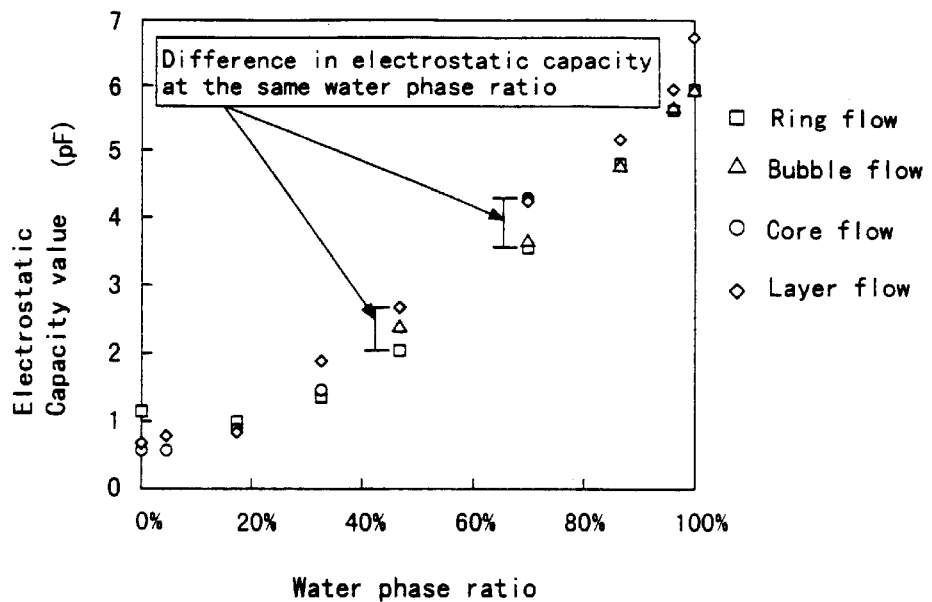
FIG. 6 shows the relationship between a water phase ratio and an electrostatic capacity value measured by the capacitance water cut meter of FIG. 5.
Figure 7:
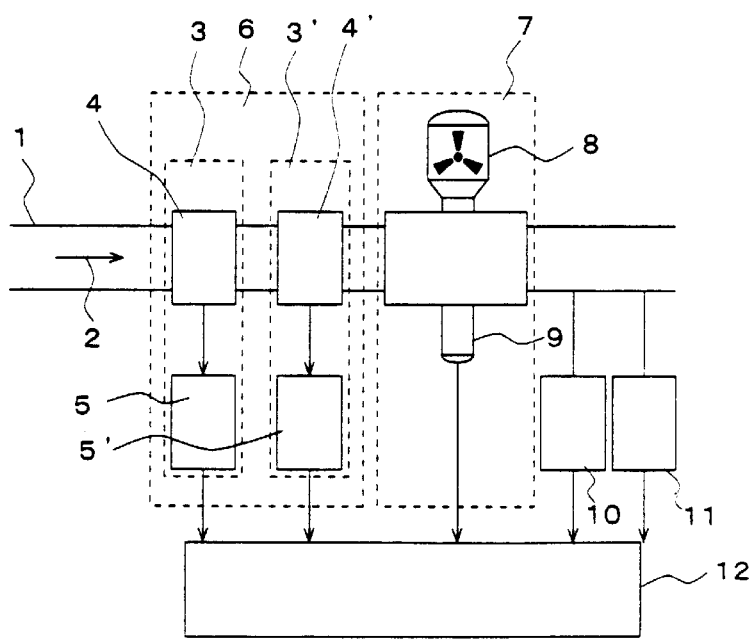
FIG. 7 is a block diagram of a conventional flow meter for a multiphase flow.

Using the capacitance water cut meter shown in FIG. 5, a phantom experiment using water and a plastic bar simulating several representative flow patterns was conducted. The results of measurement of the distribution of an electrostatic capacity against a water phase ratio of the fluid are shown in FIG. 6, wherein $l_s/D = 0.36$, $l_m/D = 0.36$, $l_d/D = 0.18$, $L/D$ 1.45, and $x/D = 0.45$.

The results show that the dispersion of electrostatic capacity values due to a difference in flow pattern of a multiphase fluid was greatly improved as compared with those in conventional flow meters at the same water phase ratio.

In other words, the water cut meter of the present invention can reduce dispersions of measured electrostatic capacity values due to a difference in flow pattern and can thereby provide a water phase ratio of a multiphase fluid accurately without specifying a flow pattern.

What is claimed is:

1. A method of measuring flow rates of respective fluids in a multiphase fluid, the multiphase fluid consisting of a gas phase constituted by a gas and a liquid phase constituted by a plurality of liquids, the method comprising the steps of:

arranging a cross-correlation flow meter in a pipe through which the multiphase fluid is flowing, the flow meter comprising two constituent meters and a sensor, the constituent meters each measuring a first basic value of the multiphase fluid at a plurality of time intervals to obtain a plurality of first basic value measurements and the sensor measuring a second basic value of the multiphase fluid;

determining a maximum value of the plurality of first basic value measurements, the maximum value corresponding to the first basic value at an instant when the fluid flowing through the pipe and passing the corresponding constituent meter consists only of the liquid phase;

calculating a mean value of the plurality of first basic value measurements;

detecting a pattern of fluctuations of the first basic value measured by each constituent meter;

comparing the pattern of fluctuations of the first basic value measured by one of the constituent meters with the pattern of fluctuations of the basic value measured by the other constituent meter to determine a time lag between the fluctuations;

calculating component ratios of respective liquids in the liquid phase from the maximum value and characteristic values of the respective liquids;

calculating component ratios of the respective fluids in the multiphase fluid from the mean value, a characteristic value of the gas in the gas phase, and the component ratios of the respective liquids;

determining a flow velocity of the gas phase from the time lag between the fluctuations;

determining a flow velocity of the liquid phase from the second basic value; and calculating flow rates: of the respective fluids in the multiphase fluid from the component ratio of the fluid in the gas phase, the flow velocity of the gas phase, the component ratios of the liquids in the liquid phase, and the flow velocity of the liquid phase.

2. The method of claim 1, wherein the first basic value is a variable property selected from electrostatic capacitance and radiation transmittance and the second basic value is a differential pressure.

3. The method of claim 2, wherein each of the constituent meters is a capacitance water cut meter and the first basic value is electrostatic capacitance.

4. The method of claim 2, wherein each of the constituent meters is a radiation densitometer and the first basic value is radiation transmittance.

5. The method of claim 2, wherein the differential pressure is obtained from a differential pressure type flow meter.

6. A flow meter for determining flow rates of respective fluids in a multiphase fluid, the multiphase fluid consisting of a gas phase constituted by a gas and a liquid phase constituted by a plurality of liquids, the flow meter comprising:

a cross-correlation flow meter and a sensor arranged in a pipe through which the multiphase fluid is flowing, the cross-correlation flow meter consisting of two constituent meters each measuring a first basic value of the multiphase fluid at a plurality of time intervals to obtain a plurality of first basic value measurements, and the sensor measuring a second basic value of the multiphase fluid;

means for determining a maximum value of the plurality of first basic value measurements, the maximum value corresponding to the first basic value at an instant when the fluid flowing through the pipe and passing the respective constituent meter consists only of the liquid phase;

means for calculating a mean value of the plurality of first basic value measurements;

means for detecting a pattern of fluctuations of the first basic value measured by each of the constituent meters;

means for comparing the pattern of fluctuations of the first basic value measured by one of the constituent meters with the pattern of fluctuations of the basic value measured by the other constituent meter to determine a time lag between the fluctuations;

means for calculating component ratios of respective liquids in the liquid phase from the maximum value and characteristic values of the respective liquids;

means for calculating component ratios of the respective fluids in the multiphase fluid from the mean value, a characteristic value of the gas in the gas phase, and the component ratios of the respective liquids;

means for determining a flow velocity of the gas phase from the time lag between the fluctuations;

means for determining a flow velocity of the liquid phase from the second basic value; and means for calculating flow rates of the respective fluids in the multiphase fluid from the component ratio of the fluid in the gas phase, the flow velocity of the gas phase, the component ratios of the liquids in the liquid phase, and the flow velocity of the liquid phase.

7. The flow meter of claim 6, wherein the first basic value is a variable property selected from electrostatic capacitance and radiation transmittance and the second basic value is a differential pressure.

8. The flow meter of claim 7, wherein each of the constituent meters is a radiation densitometer, the first basic value is radiation transmittance, and the sensor is a differential pressure type flow meter.

9. The flow meter of claim 6, wherein each of the constituent meters is a capacitance water cut meter, the first basic value is electrostatic capacitance and the sensor is a differential pressure type flow meter.

10. The flow meter of claim 6, wherein each of the two constituent meters comprises a cylindrical driving electrode for applying a voltage signal of predetermined amplitude and frequency to the multiphase fluid, a cylindrical measurement electrode virtually grounded for detecting a current flowing through the multiphase fluid, and a cylindrical dummy electrode having a potential identical to that of the cylindrical measurement electrode, the driving electrode being arranged in parallel with the measurement electrode within the pipe for obtaining a water phase ratio in the multiphase fluid by measuring an electrostatic capacitance between the cylindrical driving electrode and the cylindrical measuring electrode, and the dummy electrode being placed between the driving electrode and the measurement electrode for reducing a part of an electric line force toward the measurement electrode through the vicinity of a wall of the pipe.

11. The flow meter of claim 10, wherein an inner diameter of the pipe is expressed by D, inner diameters of the respective cylindrical electrodes are substantially equal to D, the width of the cylindrical driving electrode is expressed by $l_s$, the width of the cylindrical measurement electrode is expressed by $l_m$. the width of the cylindrical dummy electrode is expressed by $l_d$, a distance between the cylindrical driving electrode and the cylindrical measurement electrode is expressed by L, and a distance between the cylindrical driving electrode and the cylindrical dummy electrode is expressed by x, and:

$l_s$ divided by D equals 0.3 to 1.0;
$l_m$ divided by D equals 0.3 to 1.0;
$l_d$ divided by D equals 0.1 to 0.5;
L divided by D equals 1.0 to 2.0; and
x divided by D equals 0.4 to 1.2.

12. A method of measuring flow rates of respective fluids in a multiphase fluid, the multiphase fluid consisting of a gas phase constituted by a gas and a liquid phase constituted by a plurality of liquids, the method comprising the steps of:

arranging a cross-correlation flow meter in a pipe through which the multiphase fluid is flowing, the flow meter comprising two constituent meters each measuring a basic value of the multiphase fluid at a plurality of time intervals to obtain a plurality of basic value measurements;

determining a maximum value of the plurality of basic value measurements, the maximum value corresponding to the basic value at an instant when the fluid flowing through the pipe and passing the corresponding constituent meter consists only of the liquid phase;

calculating a mean value of the plurality of basic value measurements;

detecting a pattern of fluctuations of the basic value measured by each constituent meter;

comparing the pattern of fluctuations of the basic value measured by one of the constituent meters with the pattern of fluctuations of the basic value measured by the other constituent meter to determine a time lag between the fluctuations;

calculating component ratios of the phases in the multiphase fluid from the maximum value, a characteristic value of each of the liquids in the liquid phase, a characteristic value of the gas in the gas phase, and the mean value;

determining the inner diameter of the pipe; and calculating flow rates of the respective phases in the multiphase fluid from the component ratios of the respective phases, the average flow velocity of the multiphase fluid, and the inner diameter of the pipe.

13. The method of claim 12, wherein the basic value is a variable property selected from electrostatic capacitance and radiation transmittance.

14. The method of claim 13, wherein each of the constituent meters is a capacitance water cut meter and the basic value is electrostatic capacitance.

15. The method of claim 13, wherein each of the constituent meters is a radiation densitometer and the basic value is radiation transmittance.

16. A flow meter for determining flow rates of respective fluids in a multiphase fluid, the multiphase fluid consisting of a gas phase constituted by a gas and a liquid phase constituted by a plurality of liquids, the flow meter comprising:

a cross-correlation flow meter in a pipe through which the multiphase fluid is flowing, the flow meter comprising two constituent meters each measuring a basic value of the multiphase fluid at a plurality of time intervals to obtain a plurality of basic value measurements;

means for determining a maximum value of the plurality of basic value measurements, the maximum value corresponding to the basic value at an instant when the fluid flowing through the pipe and passing the corresponding constituent meter consists only of the liquid phase;

means for calculating a mean value of the plurality of basic value measurements;

means for detecting a pattern of fluctuations of the basic value measured by each constituent meter;

means for comparing the pattern of fluctuations of the basic value measured by one of the constituent meters with the pattern of fluctuations of the basic value measured by the other constituent meter to determine a time lag between the fluctuations;

means for calculating component ratios of the phases in the multiphase fluid from the maximum value, a characteristic value of each of the liquids in the liquid phase, a characteristic value of the gas in the gas phase, and the mean value;

means for determining the inner diameter of the pipe; and means for calculating flow rates of the respective phases in the multiphase fluid from the component ratios of the respective phases, the average flow velocity of the multiphase fluid, and the inner diameter of the pipe.

17. The flow meter of claim 16, wherein the basic value is a variable property selected from electrostatic capacitance and radiation transmittance.

18. The flow meter of claim 17, wherein each of the constituent meters is a capacitance water cut meter and the basic value is electrostatic capacitance.

19. The flow meter of claim 17, wherein each of the constituent meters is a radiation densitometer and the first basic value is radiation transmittance.

* * * * *